(## United States Patent Office — 3,075,881 — Patented Jan. 29, 1963)

3,075,881
HEPATIC TREATMENT WITH 1-CYCLOHEXYL-1-PROPANOL
Joseph Nordmann, Paris, France, assignor to Compagnie Francaise des Matieres Colorantes, Paris, France, a French company
No Drawing. Filed July 26, 1961, Ser. No. 126,863
Claims priority, application France July 29, 1960
2 Claims. (Cl. 167—65)

The present invention concerns improvements in and relating to a new medicine.

It has been found that 1-cyclohexyl-1-propanol, which has the formula $$\begin{array}{c} CH_2 \quad OH \\ CH_2 \diagdown CH-CH-CH_2-CH_3 \\ CH_2 \quad CH_2 \\ \diagdown CH_2 \diagup \end{array}$$

possesses interesting sedative and choleretic properties in therapeutics for which purpose it may be given, for example, in the form of gelatine-coated pills containing 400 mg. of product.

It is a colourless liquid substance, having a refreshing smell of menthol, insoluble in water and miscible with olive oil. Its boiling point is 96–98° C. under a pressure of 16 mm. of mercury. It can be characterised by the formation of its carbamate, which has a melting point of 128–129° C.

It may be prepared, for example, from cyclohexanol according to the method described by Hell and Schaal (Berichte der deut, chem. Gesell., 1909, 42, 2232).

Pharmacological Properties 1-cyclohexyl-1-propanol is practically non-toxic taken orally; with mice its lethal dose 50 is 3.45 g. per kg. and its lethal dose 100 is 5 g. per kg. It has also very little toxicity when given by peritoneal injection (lethal dose 50 with mice: 1.65 g. per kg.).

1-cyclohexyl-1-propanol has been shown to have various pharmacodynamic properties. If it has no action of the thermic regulating center and if it is not hypnotic, it manifests itself by other central actions. These are characterised by a distinct inhibiting effect towards epileptic-like convulsions caused by a series of chemical agents, such as strychnine, picrotoxin, caffeine or amphetamine, or by physical agents such as sound (audiogenic crisis). It potentializes slightly the effects of the barbiturates.

All these effects together enable it to be classed as a light sedative without a neurotoxic effect.

In addition, this compound has a remarkable choleretic action which completes its sedative central activity. It increases choleresis in an important way and prolongs it for a much longer period of time than the conventional choleretics. It acts as a true choleretic. For example, if it is given introduodenally to a rat in a dose of $\frac{1}{10}$ of the minimum non-toxic dose (300 mg./kg.) and if the bile flow is measured by a timed tubing, an increase in the flow is obtained after 1, 2 and 3 hours which is, respectively, 173%, 232% and 214%, whereas sodium dehydrocholate taken as control, at the same dose, which represents $\frac{3}{10}$ of its minimum non-toxic dose gives values of 294%, 78% and 6% respectively for the increase in the basic choleresis. This then represents for the third hour which follows the injection of the substance, an activity 35 times than that of this conventional choleretic. Its action is immediate and is shown experimentally in a clear manner in the first fifteen minutes which follow the injection. The increase of the flow of bile, although considerable and regular, which maintains a constant flow on the animal for at least three hours, does not cause hydrocholeresis, the concentration of the bile salts remaining stable and the diuresis not being modified.

Application in Human Therapy

These results have led to clinical experimentation which bears specially on hepatic migraines, the menstrual migraines of women and migraines of alimentary and allergic origin, in the form of 2 to 3 gelatine-coated pills each containing 400 mg. of 1-cyclohexyl-1-propanol from the beginning of the attack. In the whole the results show that all these types of migraine were abolished or at least much reduced.

The following are detailed results of some of this clinical experimentation to which of course the invention is not limited.

(1) *Madame L. R.*—Attacks of migraine from about the age of 25 once or twice a month, more often paramenstrual and ceasing during three pregnancies.

Clinical and radiology—negative.

Hepatic biological tests—normal.

All therapeutics of no use except aspirin in a strong dose which reduces the crises from 24 to 12 hours.

After taking three of the above mentioned gelatine-coated pills at 1 hour intervals from the beginning of the attack the attack yields after 12 hours.

(2) *Madame L. L.*—Menopause 3 years ago with flushing and migraines at the time of periods which are irregular in frequency and in intensity.

Some degree of action of oestradiol-testosterone on menorrhagia and flushing but not on the migraine.

As the migraines are very irregular with regard to date and intensity, two pills given per day for three consecutive days.

No migraine developed, not even during the following 15 days.

(3) *Madame M. L.*—Hepatalogy with constipation.

Excess weight: 78 kg. per 1.66 m.

Seems to follow a fairly strict diet, however.

Radiology: Cholecystotomy.

3 pills per day for 15 days.

After the 5th day pain disappeared and constipation improved.

No action on weight.

(4) *Madame V. R.*—Dyspepsia with migraine independent of periods; diarrhoea and constipation alternatively.

Thinness: 48 kg. per 1.62 m.

Radiology: Dolochogastria.

Vesicular atonia.

2 pills per day.

Very rapid improvement—return of appetite and weight. Stools become regular. Result maintained 15 days after the end of treatment.

(5) *Madame J. Q.*—Hyposthenic dyspepsia with fullness after meals. Coated tongue—very regular—no constipation.

Radiology: Cholecystotomy with delay of evacuation.

Three pills given per day for 15 days. Easier digestion, no fullness—slight tendency to diarrhoea.

In brief, 1-cyclohexyl-1-propanol is a new pharmacological agent the main therapeutic characteristics of which are those of an anti-migraine sedative for migraines of hepatobiliary origin and those of a choleretic.

I claim:

1. Process for the treatment of hepatic disorders which comprises administering to a human being 1-cyclohexyl-1-propanol.

2. Process for the treatment of hepatic disorders which comprises administering to a human being 1-cyclohexyl-1-propanol in the form of gelatine-coated pills each containing 400 mg. of the 1-cyclohexyl-1-propanol.

References Cited in the file of this patent

Clarkson: Tablet Coating, Drug & Cosmetic Industry, 1951, page 51.

Hell: Ber., vol. 42, 1909, page 2232.